United States Patent [19]
Fairchild

[11] 3,855,516
[45] Dec. 17, 1974

[54] BATTERY CHARGER
[75] Inventor: Harold W. Fairchild, Galesburg, Ill.
[73] Assignee: Outboard Marine Corporation, Waukegan, Ill.
[22] Filed: Aug. 6, 1973
[21] Appl. No.: 385,986

[52] U.S. Cl.................... 320/22, 320/37, 320/39
[51] Int. Cl. .............................................. H02j 7/10
[58] Field of Search ............................. 320/22–25, 320/37, 38, 39, 40

[56] References Cited
UNITED STATES PATENTS

| | | | |
|---|---|---|---|
| 3,081,426 | 3/1963 | Bakke | 320/38 X |
| 3,178,629 | 4/1965 | Saslow | 320/23 |
| 3,421,066 | 1/1969 | Flynn et al. | 320/23 X |
| 3,517,295 | 6/1970 | Lapuyade | 320/39 X |
| 3,609,506 | 9/1971 | Frezzolini et al. | 320/25 |
| 3,678,363 | 7/1972 | Ringle | 320/24 |

Primary Examiner—J. D. Miller
Assistant Examiner—Robert J. Hickey
Attorney, Agent, or Firm—Michael, Best & Friedrich

[57] ABSTRACT

Disclosed herein is a battery charging circuit including rectifying means for converting a source of alternating current to direct current, means connected to the rectifying means for applying the direct current to the battery at a level providing a high charge rate, means connected to the rectifying means for diminishing the current level applied to the battery to a reduced level after charging of the battery to a predetermined voltage level, and time controlled means for further reducing the current level applied to the battery to a trickle level after the expiration of a given time.

11 Claims, 2 Drawing Figures

PATENTED DEC 17 1974 3,855,516

BATTERY CHARGER

BACKGROUND OF THE INVENTION

The invention relates generally to battery charging. Many patents disclose various battery charging devices. Such patents include the following U.S. patents:

| | | |
|---|---|---|
| Chait | 3,193,750 | July 6, 1965 |
| Walsh | 3,305,755 | Feb. 21, 1969 |
| Rueben | 3,590,358 | June 29, 1971 |
| Ringle | 3,678,673 | July 18, 1973 |
| Reeves | 3,688,177 | August 29, 1972 |

SUMMARY OF THE INVENTION

The invention provides a battery charging circuit comprising rectifying means for converting a source of alternating current to direct current, means connected to the rectifying means for applying the direct current to a battery at a current level providing a high charging rate, means connected to the rectifying means for diminishing the current level applied to the battery to a reduced level in response to charging of the battery to a predetermined voltage level, and means further reducing the current level applied to the battery to a trickle level lower than the reduced level after expiration of a given time.

In more particular accordance with the invention, the direct current applying means comprises a main transistor having a base, an emitter connected to the negative terminal of the rectifying means, and a collector connected to the negative battery terminal, together with means for applying current to the transistor base including a first circuit branch having a second transistor including a base, an emitter connected to the positive terminal of the rectifying means and a collector connected to the base of the main transistor. In addition, the base current applying means also includes a second circuit branch connected in parallel relation to the rectifying means with the first circuit branch and including resistance means and a connection between the second transistor base and said second circuit branch, whereby to turn on the second transistor at a first conduction level to cause the base of the main transistor to be turned on at a conduction level affording a high battery charging rate.

In still further accordance with the invention, the current level diminishing means includes a first shunt circuit path connected to the rectifying means in parallel relation with the connection of the battery to the rectifying means and including a transistor having an emitter and a collector in the shunt path, and a base, together with a second circuit path connected to the rectifying means in parallel relation with the shunt path and including an SCR having an annode and a cathode in the second path and a gate, the second circuit path being electrically connected to the transistor base to turn on the transistor in response to conduction by the SCR, and a voltage breakdown device connected to the rectifying means and to the gate and operable to breakdown in response to charging of the battery to a given voltage level and to accordingly cause the SCR to conduct.

In still further accordance with the invention, the means for further reducing the current level to the battery comprises a time control switch operable to disconnect the current level diminishing means from the rectifying means and to disconnect the transistor base current applying means from the rectifying means, together with a shunt current path including resistance and connected to each of the collector, emitter, and base of the main transistor so as to turn on the main transistor and thereby apply current to the battery in accordance with the resistance of the shunt path and at a relatively low or trickle current level.

One of the principal features of the invention is the provision of a battery charging circuit which automatically reduces the current level applied to the battery being charged in response to attainment of a given battery voltage charge level and which automatically further reduces the level of current applied to the battery in response to expiration of a predetermined time span.

Another of the principal features of the invention is a battery charging circuit which will charge a battery at a relatively high current level until attainment of a specific battery voltage level below the gassing line, so as to thereby prevent excessive heat generation, and thereafter to reduce the charging current to prevent abnormal gassing. After a given time period, the circuit will thereafter automatically convert to a trickle charge level to prevent battery discharge.

Another principal feature of the invention is the provision of a circuit operable to charge a battery while preventing abnormal gassing.

Still another of the principal features of the invention is the provision of a battery charging circuit which will provide reliable operation over a long and useful life and which is economical to construct and operate.

Other features and advantages of the invention will become known by reference to the following drawings, general description and claims.

DRAWINGS

DESCRIPTION OF THE PREFERRED EMBODIMENT

Figure 1:
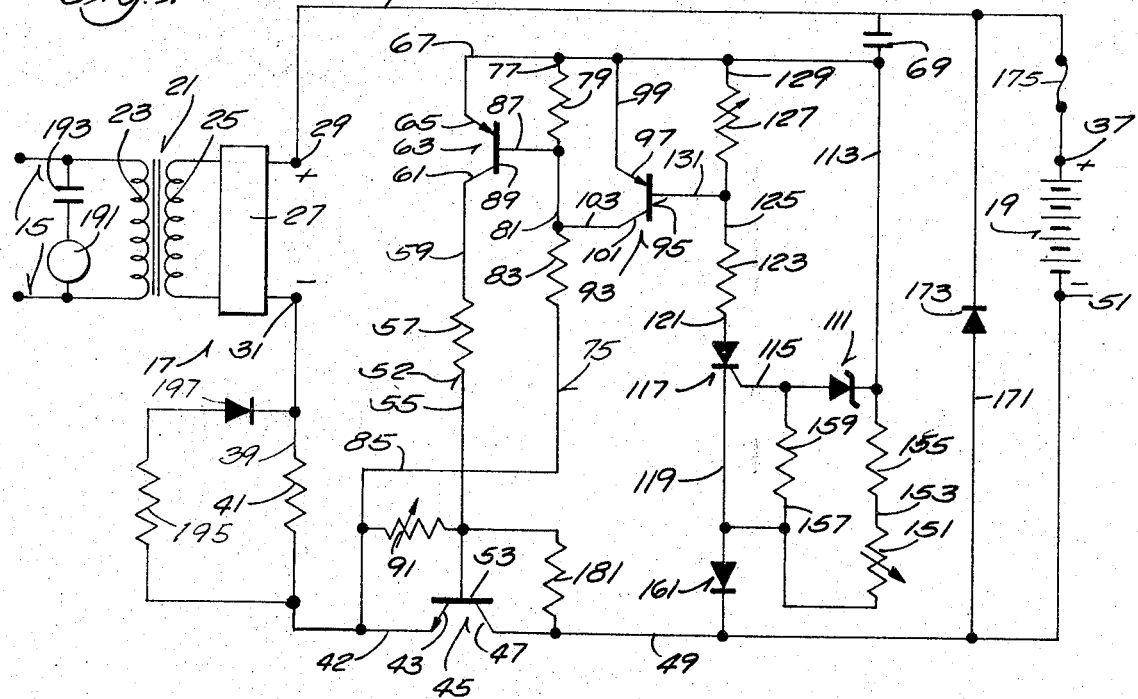
FIG. 1 is a schematic circuit diagram of one battery charging circuit in accordance with the invention.

Before explaining the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein is for the purposes of description and should not be regarded as limiting.

GENERAL DESCRIPTION

Shown in FIG. 1 is a schematic diagram of a battery charging circuit 11 which incorporates various of the features of the invention and which is powered by a source 15 of standard alternating current, i.e., alternating current at about 115 volts. The circuit 11 includes any suitable rectifier means 17 for converting the source 15 of alternating current to direct current, means for applying the direct current to a battery 19 at a current level providing a high charging rate, means for reducing the current level applied to the battery 19 to a reduced level after charging of the battery to a predetermined voltage level, and means operable, after the expiration of a given time span, for further reducing the current level applied to the battery to a trickle level lower than the reduced level.

The circuit can also include means operable, in the event the current level applied to the battery has not already been diminished to the reduced level and after expiration of a given time interval, for reducing the current level applied to the battery to the reduced level.

More particularly, in FIG. 1, the means 17 for rectifying the standard alternating current to a direct current for charging the battery 19 comprises a transformer 21 having one coil 23 connected to the alternating current source 15 and a second coil 25 connected to a full wave rectifier 27 which can be of any desired construction, which is shown schematically in FIG. 1, and which includes a positive terminal 29 and a negative terminal 31.

The means for applying the rectified direct current to the battery 19 at a current level providing a high charging rate includes, in the illustrated construction, connection of the positive rectifier terminal 29 to a lead 35 which, in turn, is connected to a terminal 37 adapted to be connected to the positive terminal of the battery 19. In addition, the negative rectifier terminal 31 is connected by a lead 39 to a ballast resistor 41 which, in turn, is connected through a lead 42 to an emitter 43 of a main transistor 45. In turn, the collector 47 of the transistor 45 is connected by a lead 49 to a terminal 51 adapted to be connected to the negative terminal of a battery 19.

The means for applying direct current at a high charging rate to the battery 19 further includes means for applying current to the base 53 of the transistor 45. In this regard, there is provided a first circuit branch 52 which includes a lead 55 connected to the transistor base 53 and to a resistor 57 which, in turn, is connected through a lead 59 to the collector 61 of a second transistor 63. The emitter 65 of the second transistor 63 is connected through a lead 67 to the positive rectifier terminal 29 subject to the action of a timer switch 69 which is closed during charging above a trickle level and which will be referred to hereinafter. In addition, there is provided a second circuit branch 75 including a lead 77 which is connected to the positive rectifier terminal 29, subject to the action of the timer switch 59 and which is connected to one end of a resistor 79 which has a relatively large resistance and which, at its other end, is connected through a lead 81 to a resistor 83 which, in turn, is connected by a lead 85 to the lead 42 between the ballast resistor 41 and the transistor emitter 43. Control of the transistor 63 is provided by a lead 87 connecting the transistor base 89 to the lead 81 between the resistors 79 and 83 of the second circuit branch 75. As a result, the potential between the resistors 79 and 83 is applied to supply current to the transistor base 89 to turn on the transistor 63 at a given conduction level.

Means are also provided for varying the rate of conduction of the transistor 45. In this regard, there is connected between the lead 55 and the lead 85 a resistor 91 having a variable resistance. Accordingly, by varying the resistance of the resistor 91, the current applied to the transistor base 53 can be varied so as to adjustably set the conduction level of the transistor 45 under high current charge conditions.

The means for diminishing the current level applied to the battery to a reduced level after charging of the battery 19 to a predetermined voltage level is provided, in the illustrated circuit, by a transistor controlled shunt 93 path connected in parallel relation with the battery 19, and voltage responsive means operable, in response to charging of the battery 19 to a predetermined voltage level, to turn on the shunt path 93.

More particularly, the shunt circuit path 93 comprises a transistor 95 including an emitter 97 connected by a lead 99 to the positive rectifier terminal 29 subject to the action of the beforementioned timer switch 69. The collector 101 of the transistor 95 is connected through a lead 103 to the lead 81 connecting the resistors 79 and 83 of the second circuit branch 75. Thus, there is provided a shunt circuit path through the lead 99, the transistor 95, the resistor 83, and the lead 85.

The voltage responsive means for turning on the shunt path 93 operates to control the transistor 95 and comprises a zenor diode 111 which includes a cathode connected by a lead 113 through the timer switch 69 to the positive rectifier terminal 29. In addition, the zenor diode 111 includes an anode connected by a lead 115 to the gate of an SCR 117 having a cathode connected by a lead 119 to the collector of the transistor 45. The SCR 117 also includes an anode connected by a lead 125 to a variable resistor 117 which, in turn, is connected by a lead 129 to the positive rectifier terminal 29 subject to the action of the timer switch 69. Connected to the lead 125 between the resistors 123 and 127 is a lead 131 which is connected to the base of the transistor 95 whereby to turn on the transistor 95 in response to turning on of the SCR 117.

The variable resistor 127 constitutes a means for controlling the level of conduction in the shunt path 93 by controlling the rate of conduction of the transistor 95.

Means are also provided for controlling the battery voltage charge level at which the zenor diode 111 breaks down. In the illustrated construction, such means comprises a variable resistor 151 which is connected by a lead 153 including a resistor 155 to the cathode of the zenor diode 111 and which is connected by a lead 157 including a resistor 159 to the anode of the zenor diode 111. In addition, the lead 157 is connected to the lead 119 and there is provided in the lead 119 a diode having an anode connected to the cathode of the SCR 117 and to the lead 157 and a cathode connected to the collector 47 of the transistor 45. Accordingly, variation in the resistance setting of the resistor 151 will determine the voltage charge level of the battery 19 at which the zenor diode 111 breaks down.

In order to prevent damage to the circuit 11 in the event a battery is placed in the circuit in reverse electrical connection, there is provided a shunt lead 171 including a diode 173 having a cathode connected to the lead 35 connected to the positive battery terminal 37 and an anode connected to the lead 49 connected to the negative battery terminal 51. In addition, a fuse 175 is provided in the lead 35 between the positive battery terminal 37 and the diode 173.

The means for further reducing the current level applied to the battery to a trickle level lower than the reduced level after the expiration of a given time span includes means for applying a trickle charge to the battery 19 when the timer switch 69 is open and means for opening the timer switch 69 after the expiration of the given time span.

The means for applying a trickle charge to the battery 19 when the timer switch 69 is open comprises, in the illustrated construction, the before mentioned variable resistor 91 and a resistor 181 which has a relatively large resistance, which is connected to the lead 55 between the resistor 57 and the transistor base 53, and which is also connected to the transistor collector 47. Thus, current flow through the resistors 91 and 181 will provide current to the transistor base 53 sufficient to turn on the transistor 45 at a low or trickle conduction level even though the time switch 69 is open so as to prevent current flow through the transistor 63 to the transistor base 53.

The before mentioned timer switch 69 comprises a part of a timer 191 which is connected to the alternating current source 15 and which includes a switch 193 controlling timer operation.

In operation, and assuming the transformer 21 is connected to the alternating current source 15 and that a battery is connected in proper relation to the terminals 37 and 51, a trickle charge will initially be applied to the battery. However, immediately upon connection of the battery, the timer 191 is also turned on to initially close the control switch 193 and to momentarily thereafter close the timing switch 69. After closure of the timer control switch 193, the timer 191 will operate so as to thereafter open the timing switch 69 after a predetermined time interval and to thereafter immediately open the control switch 193.

Upon closure of the timing switch 69, the transistor base 53 is subject to the current present in the first circuit branch 52. The transistor 45 is thus turned on at a given conduction level to cause current flow at a constant high charge rate. As already indicated, the current level of the high charge rate can be varied by adjustment of the resistor 91. Battery charging thereafter takes place at a substantially constant current as the zenor diode 111 retains the SCR in an off condition and as the increase in resistance which occurs in the battery 19 due to charging thereof is minimal as compared to the resistance value of the resistor 57.

During charging at the high current rate, the battery charge voltage increases and when the charge on the battery 19 reaches a predetermined voltage level, said voltage level is applied to the zenor diode 111 causing the zenor diode 111 to break down and to turn on the SCR 117. As has already been mentioned, the voltage level at which the zenor diode 111 breaks down can be varied by varying the resistor 151. When the SCR 117 turns on, the base of the transistor 95 is subject to current determined by the potential between the resistors 127 and 123 and turns on at a level determined by such current. As already indicated, the conduction level of the transistor 95 can be varied by varying the resistance of the resistor 127. When the transistor 95 turns on, the current flowing through the shunt path 93 serves to lower the current flow through the transistor 63 and thereby to reduce the conduction rate of the transistor 45 to a reduced current level preventing unwanted battery gassing.

During the time when the SCR is conducting, the level of the reduced charging current continually decreases as resistance to current flow through the shunt path 93 remains essentially constant. At the end of the predetermined time span controlled by the timer 191, the timing switch 69 is opened and thereafter the battery 19 is under a trickle charge until removed from the circuit 11. As already indicated, shortly after opening of the timing switch 69, the timer control switch 193 is also opened to shut off the timer 191.

Figure 2:
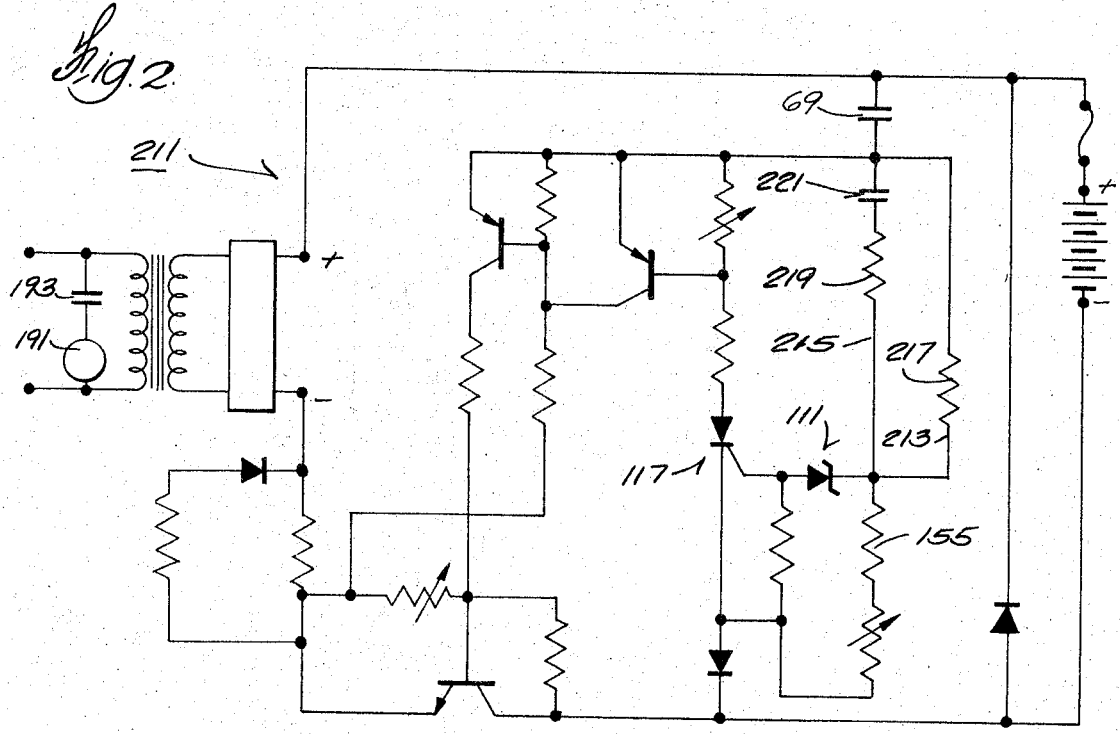
FIG. 2 is a schematic circuit diagram of a second battery charging circuit in accordance with the invention.

Shown in FIG. 2 is another battery charging circuit 211 which is identical to that shown in FIG. 1 except as explained below. Accordingly, the same reference numerals have been applied to the components illustrated in FIG. 2 as have been applied to the corresponding components of the circuit 11.

The circuit 211 differs from the circuit 11 in that the zenor diode 111 and resistor 155 are connected to the timing switch 69 through parallel leads 213 and 215, with the lead 213 including a resistor 217 and with the lead 215 including a resistor 219 and a switch 221 which is controlled by the timer 191. The switch 221 remains open for a predetermined time after closure of the timing switch 69 and, upon expiration of said predetermined time, closes and remains closed until after opening of the timing switch 69 and before opening of the switch control 193. During the time when the switch 221 is open, the circuit 211 will operate as already described with respect to the circuit 11. However, if the predetermined voltage charge of the battery has not been reached within the predetermined time interval after the timing switch 69 turns on, the switch 221 will be closed by the timer 191 to break down the zenor diode 111 and to turn on the SCR 117. Thereafter, operation occurs the same as if the zenor diode 111 had been broken down due to the charge on the battery reaching the before mentioned predetermined level.

In further accordance with the invention, means are provided for visually signalling the state of charge of the battery 19. While other arrangements could be employed, in the illustrated construction there is provided, in parallel relation to the resistor 41, a series connected resistor 195 and a diode 197, with the cathode of the diode 197 being connected to the negative terminal 21 of the rectifier means 27.

The diode 197 emits light when subject to a voltage above a given level, and will emit light of increasing intensity when subject to increasing applied voltage above the given level. The resistor 195 is selected to control the voltage applied to the diode 197 and thereby to determine the battery charge level at which the diode 197 will stop emitting light. In this regard, as the battery charge increases, the battery charging voltage decreases, as already explained. Thus, cessation of light emission by the diode 197 indicates that the battery has reached a pre-selected charge level.

Various of the features of the invention are set forth in the following claims.

I claim:

1. A circuit for charging a battery from an alternating current source comprising rectifying means for converting a source of alternating current to direct current, positive and negative battery charging terminals adapted to be respectively connected to like terminals of a battery to be charged, and means connected to said rectifying means and to said battery charging terminals for charging the battery and including a main transistor having an emitter-collector path connected between said rectifying means and one of said battery terminals and also having a base, said battery charging means also including a timer including normally open switch means, means for manually closing said switch means, and means for opening said switch means after expiration of a given time period unrelated to the battery voltage level, said battery charging means also including means subject to said switch means being closed and connected to said transistor base for applying the direct current to said battery charging terminals at a high current level to provide a high charging rate, said battery charging means also including means subject to said switch means being closed and connected to said transistor base for applying the direct current to said battery charging terminals at a reduced current level below said high current level after charging of the battery to a predetermined voltage level, and said battery charging means also including means connected to said transistor base for applying the direct current to said battery charging terminals at a trickle current level lower than said reduced current level when said switch means is open.

2. A battery charging circuit in accordance with claim 1 wherein said means for applying the direct current at said reduced level comprises a first shunt circuit path connected to said rectifying means in parallel with the application of current to the battery and including a transistor including an emitter and a collector in said shunt path and a base, said means for applying the direct current at said reduced level further comprising a second circuit path connected to said rectifying means in parallel with said shunt path and including an SCR having an anode and a cathode in said shunt path and a gate, said second circuit path being electrically connected to said transistor base to turn on said transistor in response to conduction by said SCR, and said means for applying the direct current at said reduced level further including a voltage breakdown device connected to said rectifying means and to said gate and operable to breakdown in response to charging of the battery to a given voltage level and accordingly to cause said SCR to conduct.

3. A battery charging circuit in accordance with claim 2 wherein said means for applying the direct current at said reduced level further includes a variable resistor means associated with said voltage breakdown device for varying the battery voltage level which causes breakdown of said device.

4. A battery charging circuit in accordance with claim 2 wherein said means for applying the direct current at said reduced level further includes, in said second circuit path, a variable resistor means for varying the level of conduction of said transistor.

5. A battery charging circuit in accordance with claim 1 wherein said main transistor includes a base and said means for applying direct current to said battery terminals at a high current level includes means for applying current to said main transistor base including a first circuit branch having a second transistor with a base, an emitter connected to said rectifying means, and a collector connected to said main transistor base, said base current applying means also including a second circuit branch connected to said rectifying means in parallel with said first circuit branch and including resistance means and a connection between said second transistor base and said second circuit branch to turn on said second transistor at a first conduction level to cause said main transistor to be turned on at another conduction level.

6. A battery charging circuit in accordance with claim 5 wherein said means for applying direct current to said battery terminals at a high current level includes a variable resistor means connected between said first and second circuit branches to vary the current applied to said main transistor base and thereby to vary the conduction level of said main transistor.

7. A battery charging circuit in accordance with claim 2 wherein said main transistor includes a base and said means for applying direct current to said battery terminals at a high current level includes means for applying current to said main transistor base including a first circuit branch having a second transistor including a base, an emitter connected to said rectifying means and a collector connected to said main transistor base, said base current applying means also including a second circuit branch connected to said rectifier means in parallel with said first circuit branch and including resistance means and a connection between said second transistor base and said second circuit branch whereby to turn on said second transistor at a first conduction level so as to cause said main transistor to be turned on at a second conduction level.

8. A battery charging circuit in accordance with claim 7 wherein said first and second circuit branches have a common portion.

9. A battery charging circuit in accordance with claim 1 wherein said means for applying direct current to said battery charging terminals at a trickle current level includes a shunt current path including a resistance connected to said main transistor collector, to said main transistor emitter, and to said main transistor base to apply current to said base in accordance with the value of said resistance in said shunt path.

10. A battery charging circuit in accordance with claim 1 and further including means for preventing damage to said circuit in the event of reverse battery connections, said damage preventing means including a diode having an annode connected to said negative battery charging terminal and a cathode connected to said positive battery charging terminal, and a fuse electrically connected between said diode and said battery.

11. A circuit for charging a battery from an alternating current source comprising rectifying means for converting a source of alternating current to direct current, positive and negative battery charging terminals adapted to be respectively connected to like terminals of a battery to be charged, and means connected to said rectifying means and to said battery charging terminals for charging the battery and including a current level control means having a control input connected between said rectifying means and one of said battery terminals, said battery charging means also including a timer including normally open timer switch means, means for manually closing said timer switch means, and means for opening said timer switch means after expiration of a given time period unrelated to the battery voltage level, said battery charging means also including means subject to said timer switch means being closed and connected to said control input of said current level control means for applying the direct current to said battery charging terminals at a high current level to provide a high charging rate, said battery charging means also including means subject to said timer switch means being closed and connected to said control input of said current level control means for applying the direct current to said battery charging terminals at a reduced current level below said high current level after charging of the battery to a predetermined voltage level, and said battery charging means also including means connected to said control input of said current level control means for applying the direct current to said battery charging terminals at a trickle current level lower than said reduced current level when said timer switch means is open.

* * * * *

UNITED STATES PATENT OFFICE
CERTIFICATE OF CORRECTION

Patent No. 3,855,516                       Dated December 17, 1974

Inventor(s)            Harold W. Fairchild

It is certified that error appears in the above-identified patent and that said Letters Patent are hereby corrected as shown below:

Column 3, line 28 through line 30    delete "an emitter 43 of a main transistor 45. In turn, the collector 47 of the transistor 45 is", insert --- a current limit control means including a control input. In the disclosed construction the current level control means comprises a main transistor 45 including an emitter 43 connected to the lead 42 and a collector 47 ---.

Column 3, line 32    after "19.", insert ---in addition, the transistor 45 includes a base 53 which functions as a control input. ---

Column 4, line 28    delete "117", insert --- 127 ---.

Column 6, line 39    delete "21", insert --- 31 ---.

Signed and Sealed this twenty-second Day of June 1976

[SEAL]

Attest:

RUTH C. MASON
Attesting Officer

C. MARSHALL DANN
Commissioner of Patents and Trademarks